(12) United States Patent
Nishioka et al.

(10) Patent No.: US 8,717,738 B2
(45) Date of Patent: May 6, 2014

(54) MULTILAYER CERAMIC ELECTRONIC COMPONENT

(75) Inventors: Masato Nishioka, Nagaokakyo (JP); Tomoro Abe, Nagaokakyo (JP); Tomonori Muraki, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 127 days.

(21) Appl. No.: 13/241,875

(22) Filed: Sep. 23, 2011

(65) Prior Publication Data

US 2012/0075766 A1    Mar. 29, 2012

(30) Foreign Application Priority Data

Sep. 28, 2010 (JP) ................................ 2010-216467
Aug. 10, 2011 (JP) ................................ 2011-174928

(51) Int. Cl.
*H01G 4/30* (2006.01)
*H01G 4/005* (2006.01)

(52) U.S. Cl.
USPC ...................................... 361/301.4; 361/303

(58) Field of Classification Search
USPC .................... 361/303, 304.1, 301.4
See application file for complete search history.

(56) References Cited

U.S. PATENT DOCUMENTS

| 7,551,422 B2 * | 6/2009 | Togashi ........................ 361/309 |
| 7,715,172 B2 * | 5/2010 | Kawasaki et al. ............. 361/303 |
| 8,120,891 B2 * | 2/2012 | Takashima et al. ......... 361/321.2 |
| 2003/0011963 A1 | 1/2003 | Ahiko et al. |
| 2005/0201040 A1 | 9/2005 | Ahiko et al. |
| 2006/0039097 A1 * | 2/2006 | Satou ............................ 361/303 |
| 2008/0100987 A1 * | 5/2008 | Togashi ..................... 361/301.4 |
| 2010/0002356 A1 * | 1/2010 | Yoshida et al. ............ 361/301.4 |
| 2010/0085682 A1 | 4/2010 | Abe et al. |

FOREIGN PATENT DOCUMENTS

| JP | 02-033908 A | 2/1990 |
| JP | 06-349669 A | 12/1994 |
| JP | 08-316087 A | 11/1996 |
| JP | 2003-031435 A | 1/2003 |
| JP | 2005-175165 A | 6/2005 |
| JP | 2005-259982 A | 9/2005 |
| JP | 2010-091285 A | 4/2010 |
| JP | 2010-092896 A | 4/2010 |

OTHER PUBLICATIONS

Abe et al., "Multilayer Ceramic Electronic Component and a Method for Manufacturing the Same," U.S. Appl. No. 13/241,863, filed Sep. 23, 2011.
English translation of Official Communication issued in corresponding Japanese Patent Application No. 2011-174928 mailed on Jan. 14, 2014.
Official Communication issued in corresponding Japanese Patent Application No. 2011-174928, mailed on Jan. 14, 2014.

* cited by examiner

*Primary Examiner* — Jayprakash N Gandhi
*Assistant Examiner* — Dion Ferguson
(74) *Attorney, Agent, or Firm* — Keating & Bennett, LLP

(57) ABSTRACT

In a multilayer ceramic electronic component, dummy electrodes are located in margin regions. In a region between an extension line of a side of a facing portion of an internal electrode facing a side surface of an element body and a side of an extending portion of the internal electrode facing the side surface, the dummy electrode is arranged not to extend to the extension line of the side facing the side surface. The dummy electrode includes a plurality of electrode pieces linearly extending in the direction parallel or substantially parallel to the side surface.

3 Claims, 11 Drawing Sheets

MULTILAYER CERAMIC ELECTRONIC COMPONENT

BACKGROUND OF THE INVENTION

1. Field of the Invention

The present invention relates to a multilayer ceramic electronic component, and in particular relates to a multilayer ceramic electronic component having a structure suitable for decreasing the thickness of ceramic layers and increasing the number of ceramic layers.

2. Description of the Related Art

In recent years, small portable electronic apparatuses, such as a cellular phone, a notebook personal computer, a digital camera, and a digital audio apparatus, have been increasingly in demand. Miniaturization of these portable electronic apparatuses is progressing, and at the same time, improvement in performance thereof is also progressing. Since many multilayer ceramic electronic components are mounted in these portable electronic apparatuses, improvement in performance is also required for the multilayer ceramic electronic components, and for example, an increase in capacity is required for multilayer ceramic capacitors. In response to this requirement, in the multilayer ceramic capacitor, a decrease in thickness of a ceramic layer has been carried out, and as a result, the number of ceramic layers to be laminated tends to be increased.

In general, a multilayer ceramic electronic component is manufactured in such a way that after internal electrode patterns are printed on ceramic green sheets to be formed into ceramic layers after firing, the ceramic green sheets are laminated to each other so as to shift the internal electrode patterns in a predetermined direction to form a mother block, and this mother block is cut into green chips each having a predetermined dimension.

In this manufacturing method, in order to prevent the internal electrode patterns from being exposed to side surfaces of the green chip caused by misalignment generated in a laminating and/or a cutting step, a margin of each side gap region between the side surface of the green chip and the side of the internal electrode pattern must be ensured. However, when miniaturization of the multilayer ceramic electronic component is performed, the ratio of the area of the side gap region to the area of the internal electrode is increased, and as a result, the capacity of the multilayer ceramic capacitor is inevitably decreased in an amount corresponding to the above increase in ratio.

In order to solve the above problem, Japanese Unexamined Patent Application Publication No. 6-349669 has disclosed that after a laminate is prepared in which two side ends of internal electrodes are exposed to side surfaces of the laminate, since ceramic green sheets are adhered to these side surfaces thereof to form side gap regions, miniaturization of a multilayer capacitor and an increase in capacity thereof can be achieved.

However, according to the technique disclosed in Japanese Unexamined Patent Application Publication No. 6-349669, in the laminate before the ceramic green sheets are adhered thereto, since no side gap regions are present, the number of areas at which ceramic layers are adhered to each other in the lamination direction is decreased, and as a result, delamination is liable to occur. In addition, the present inventors discovered that delamination is liable to occur particularly at a corner of an extending portion of an internal electrode (which is exposed to a corner portion of a green chip after cutting) in the vicinity of each of external layers (upper and lower ceramic layers on which the internal electrodes are not formed).

The reason for this is estimated that a stress is liable to be concentrated when a mother block is cut to have a predetermined dimension, and a corner portion having a small adhesion area is liable to function as a starting point of delamination.

In addition, a problem similar to that described above may occur not only in multilayer ceramic capacitors but also in multilayer ceramic electronic components other than the multilayer ceramic capacitors.

SUMMARY OF THE INVENTION

Accordingly, preferred embodiments of the present invention provide a multilayer ceramic electronic component which solves the problems described above.

According to a preferred embodiment of the present invention, a multilayer ceramic electronic component includes an element body including a pair of principal surfaces facing each other, a pair of side surfaces facing each other, and a pair of end surfaces facing each other, rounded chamfer portions along ridgelines between the side surfaces and the end surfaces, and a plurality of ceramic layers extending in a principal surface direction and laminated in a direction perpendicular or substantially perpendicular thereto and a plurality of pairs of internal electrodes which are provided along interfaces between the ceramic layers, which include exposure ends each exposed to one of the pair of end surfaces, and which are not exposed to the side surfaces; and external electrodes provided at least on the pair of end surfaces of the element body so as to be electrically connected to the exposure ends of the internal electrodes.

The internal electrodes each include a facing portion including a pair of sides parallel or substantially parallel to the side surfaces and facing an adjacent internal electrode with at least one of the ceramic layers interposed therebetween and an extending portion extending from the facing portion to the end surface to define an exposure end at the end of the extending portion.

According to preferred embodiments of the present invention, in order to solve the technical problems described above, when viewed in a width direction between the side surfaces, a width of the exposure end of the extending portion preferably is smaller than the width of the facing portion so as to define margin regions at two sides of the extending portion and between sides of the extending portion and the respective side surfaces, dummy electrodes are provided in the margin regions, and in regions each between an extension line of the side of the facing portion facing the side surface and the side of the extending portion facing the side surface, the dummy electrodes are each arranged so as not to extend to the extension line of the side facing the side surface.

The distance between a side of the dummy electrode at a side surface side and the side surface facing thereto is preferably larger than the distance between a side of the dummy electrode at an extending portion side and the side thereof facing the dummy electrode.

In addition, the dummy electrodes each preferably include a plurality of electrode pieces linearly extending in the direction parallel or substantially parallel to the side surfaces.

According to preferred embodiments of the present invention, when the width of the extending portion of the internal electrode is smaller than the width of the facing portion, the corner of the extending portion of the internal electrode (which is exposed to a corner portion of a green chip after cutting) can be withdrawn inside. Therefore, delamination caused by the influence of stress concentration at the time of cutting can be prevented and minimized.

In addition, in the margin regions located at the two sides of the extending portion of the internal electrode, since the ceramic layers are closely adhered to each other, the delamination can also be suppressed thereby.

On the other hand, the margin region is a region in which the internal electrode is not formed, and hence, a problem of the step may arise again. However, since the dummy electrode is provided in the margin region according to preferred embodiments of the present invention, the problem of the step can be solved or reduced by the dummy electrode.

In preferred embodiments of the present invention, when the distance between the side of the dummy electrode at the side surface side and the side surface facing thereto is larger than the distance between the side of the dummy electrode at the extending portion side and the side thereof facing the dummy electrode, or the dummy electrodes each include a plurality of electrode pieces linearly extending in the direction parallel or substantially parallel to the side surfaces, a significant reduction in the step and prevention of delamination can both be realized with good balance.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
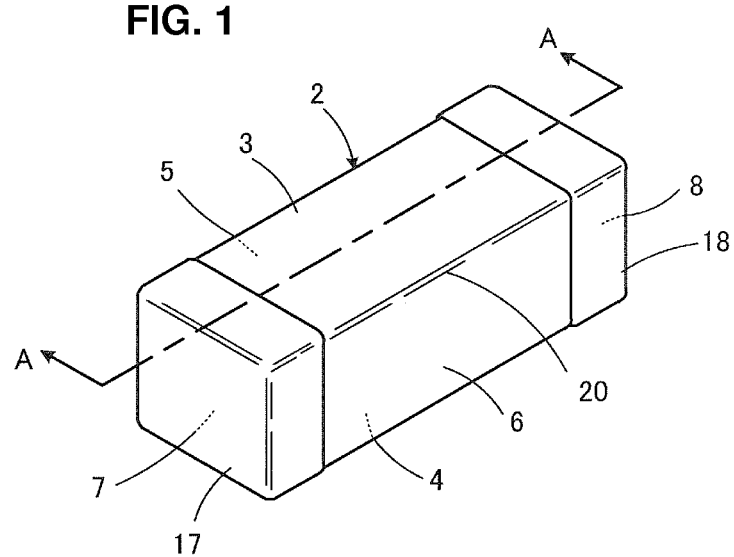
FIG. 1 is a perspective view showing the appearance of a multilayer ceramic capacitor as a multilayer ceramic electronic component according to a first preferred embodiment of the present invention.

Hereinafter, for description of preferred embodiments of the present invention, as a multilayer ceramic electronic component, a multilayer ceramic capacitor will be described by way of example.

FIGS. 1 to 9 are views illustrating a first preferred embodiment of the present invention.

First, as shown in FIGS. 1 to 5, a multilayer ceramic capacitor 1 includes an element body 2. The element body 2 includes one pair of principal surfaces 3 and 4 facing each other, one pair of side surfaces 5 and 6 facing each other, and one pair of end surfaces 7 and 8 facing each other and has an approximately rectangular parallelepiped shape, for example.

Figure 2:
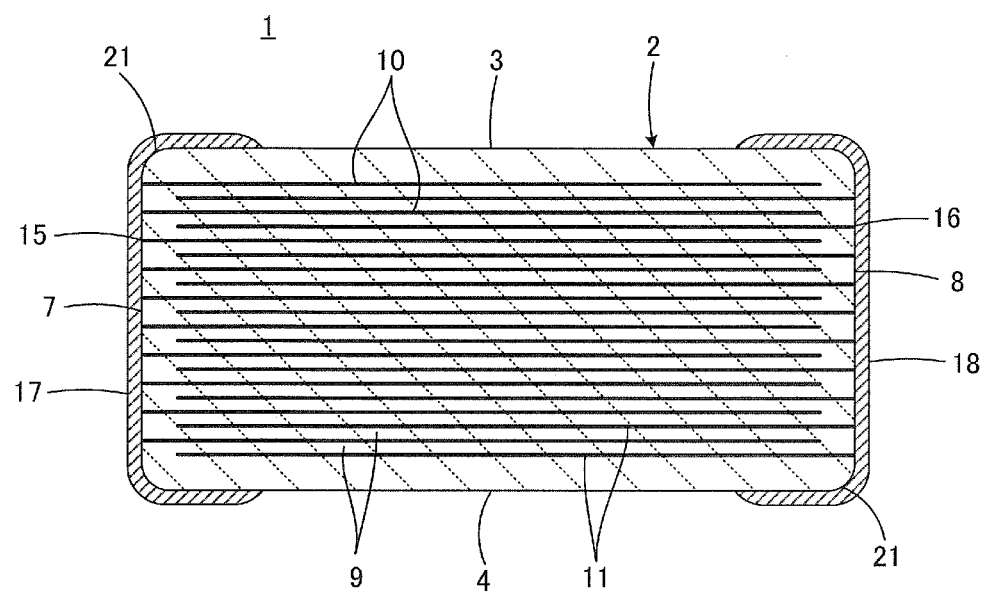
FIG. 2 is a cross-sectional view taken along the line A-A of FIG. 1.
Figure 5:
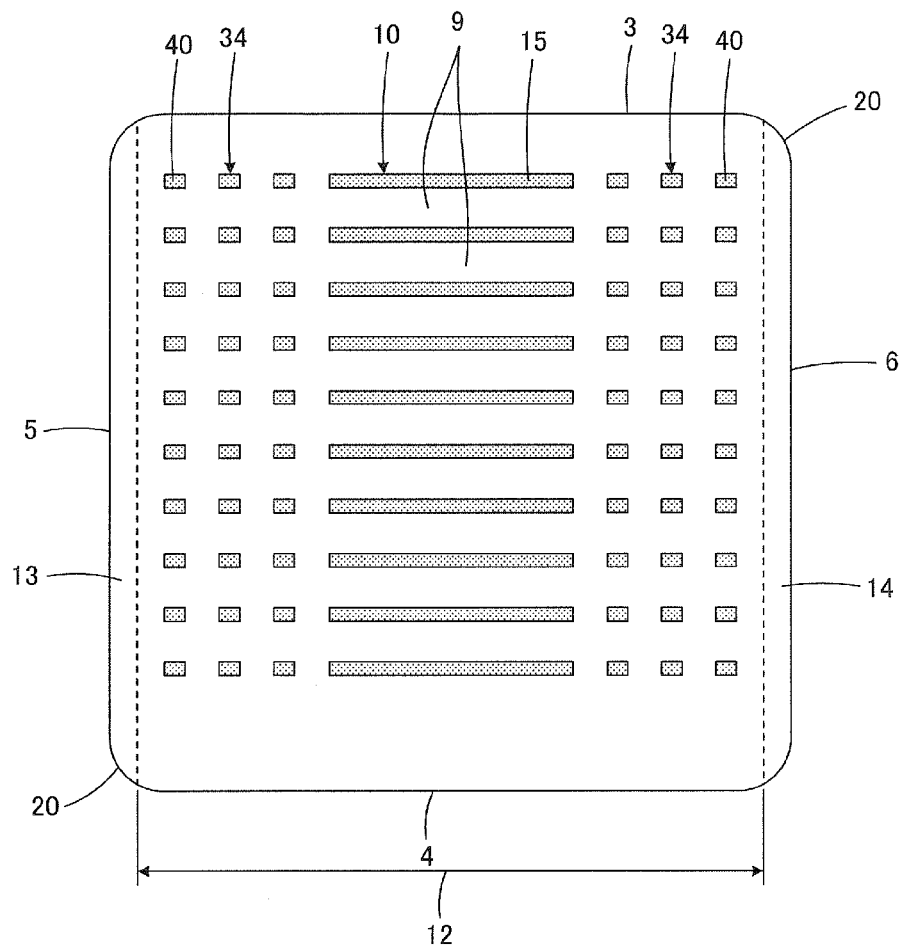
FIG. 5 is an end view of the element body of the multilayer ceramic capacitor shown in FIG. 1.
Figure 6:
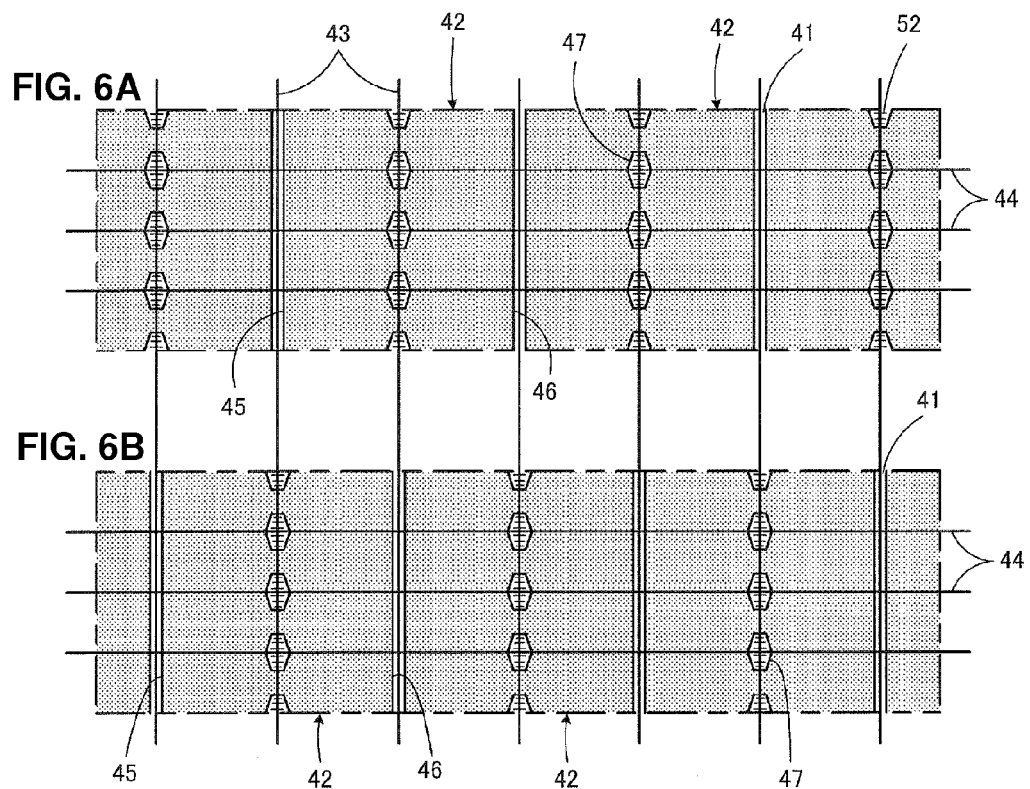
FIGS. 6A and 6B are plan views showing ceramic green sheets on each of which internal electrode patterns are provided, which are prepared to manufacture the multilayer ceramic capacitor shown in FIG. 1.

As shown in FIGS. 2 and 5, the element body 2 includes a laminate portion 12 of a laminate structure including a plurality of ceramic layers 9 extending in the direction of the principal surfaces 3 and 4 and laminated in the direction perpendicular or substantially perpendicular to the principal surfaces 3 and 4 and a plurality of pairs of first and second internal electrodes 10 and 11 arranged along the interfaces between the ceramic layers 9. In addition, as shown in FIG. 5, the element body 2 includes one pair of ceramic side surface layers 13 and 14 provided on the respective side surfaces of the laminate portion 12 so as to define the pair of side surfaces 5 and 6 described above. The ceramic side surface layers 13 and 14 preferably have the same or substantially the same thickness.

Incidentally, in FIGS. 2 and 5, compared to the other figures, the thickness direction dimensions are exaggerated for ease of illustration.

Although the details of the shapes of the internal electrodes 10 and 11 will be described later, the first internal electrode 10 includes an exposure end 15 exposed to the first end surface 7, and the second internal electrode 11 includes an exposure end 16 exposed to the second end surface 8. However, since the ceramic side surface layers 13 and 14 described above define side gap regions, the internal electrodes 10 and 11 are not exposed to the side surfaces 5 and 6 of the element body 2.

Furthermore, the multilayer ceramic capacitor 1 includes external electrodes 17 and 18 provided at least on the pair of end surfaces 7 and 8 of the element body 2 so as to be electrically connected to the respective exposure ends 15 and 16 of the internal electrodes 10 and 11.

Figure 3:
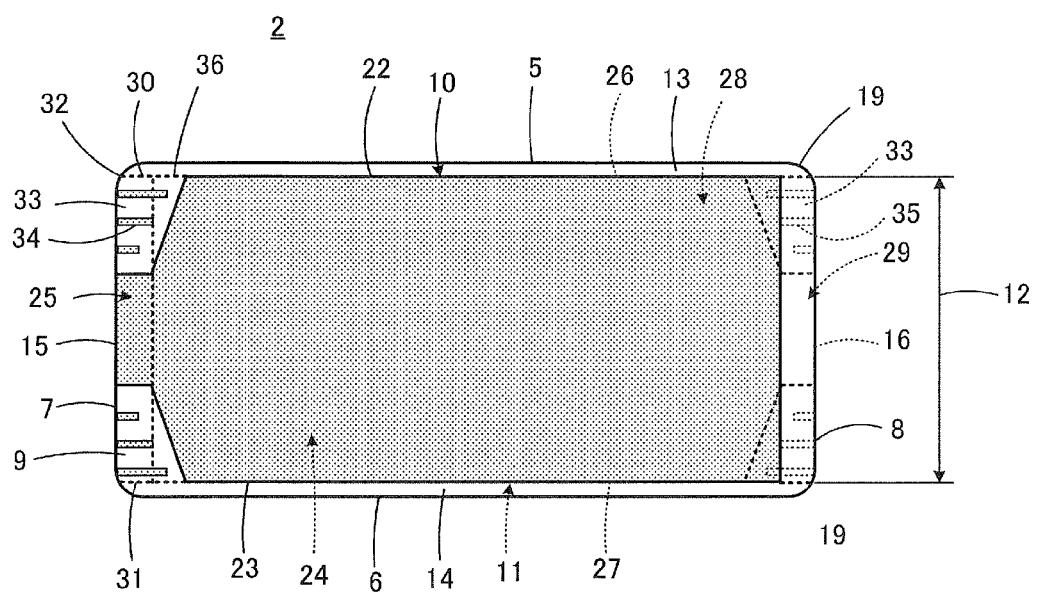
FIG. 3 is a plan view showing an internal structure of an element body of the multilayer ceramic capacitor shown in FIG. 1.
Figure 4:
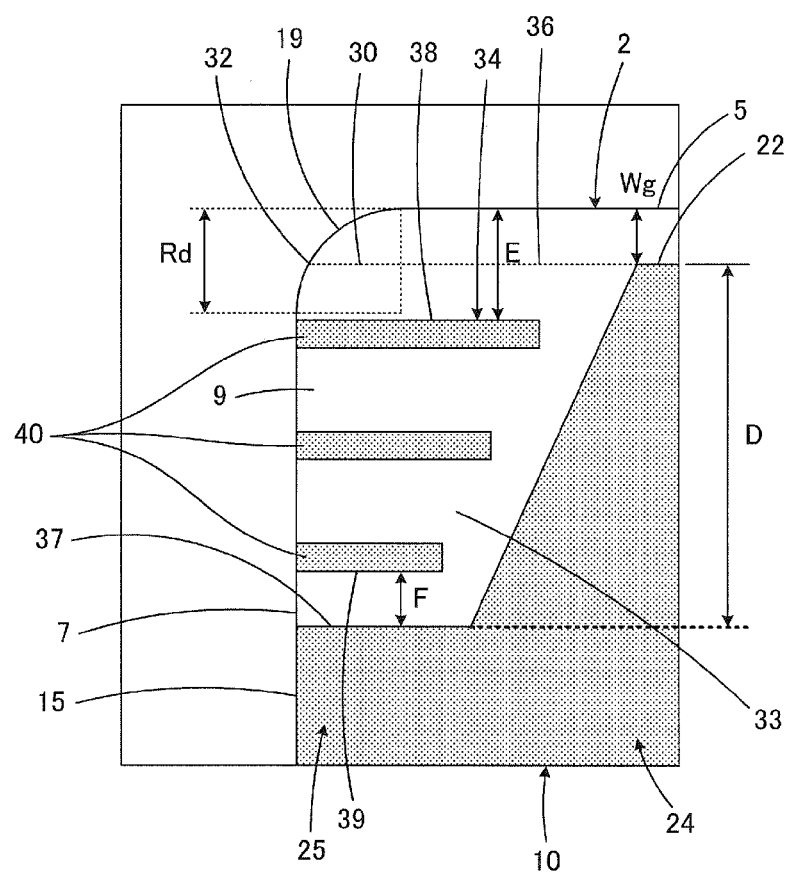
FIG. 4 is an enlarged view of the upper left portion shown in FIG. 3.

In the element body 2, rounded chamfer portions 19 are arranged along the ridgelines between the side surfaces 5 and 6 and the end surfaces 7 and 8 as shown in FIGS. 3 and 4; rounded chamfer portions 20 are arranged along the ridgelines between the principal surfaces 3 and 4 and the side surfaces 5 and 6 as shown in FIGS. 1 and 5; and furthermore, as shown in FIG. 2, rounded chamfer portions 21 are arranged along the ridgeline between the principal surfaces 3 and 4 and the end surfaces 7 and 8.

As clearly shown in FIG. 3, the first internal electrode 10 includes a facing portion 24 including a pair of sides 22 and 23 parallel or substantially parallel to the side surfaces 5 and 6 and facing the second internal electrode 11 with at least one ceramic layer 9 interposed therebetween and an extending portion 25 extending from the facing portion 24 to the first end surface 7 to define the exposure end 15 at the end of the extending portion. The exposure end 15 of the first internal electrode 10 exposed to the first end surface 7 is shown in FIG. 5.

In the plan shape of the first internal electrode 10, when viewed in the width direction between the side surfaces 5 and 6, the width of the exposure end 15 of the extending portion 25 is preferably smaller than the width of the facing portion 24. In particular, in this preferred embodiment, the extending portion 25 has a substantially rectangular shape, the total width of the extending portion 25 is preferably smaller than the width of the facing portion 24, and in a region of the facing portion extending to the extending portion 25, the width is gradually decreased so as to be equal to the width of the extending portion 25. In addition, the extending portion 25 may have a substantially trapezoidal shape in which a width direction dimension is gradually decreased toward the end surface 7.

As in the case described above, the second internal electrode 11 shown by the dotted line in FIG. 3 also includes a facing portion 28 including a pair of sides 26 and 27 parallel to the side surfaces 5 and 6 and facing the first internal electrode 10 with at least one ceramic layer 9 interposed therebetween and an extending portion 29 extending from the facing portion 28 to the second end surface 8 to define the exposure end 16 at the end of the extending portion. The second internal electrode 11 has a plan shape symmetrical to that of the first internal electrode 10 described above.

As described above, since the facing portion 24 of the first internal electrode 10 and the facing portion 28 of the second internal electrode 11 face each other with at least one ceramic layer 9 interposed therebetween, electrical properties are obtained between these facing portions 24 and 28. That is, in the case of this multilayer ceramic capacitor 1, an electrostatic capacity is formed.

The facing portion 24 of the first internal electrode 10 is substantially flat in the direction between the sides 22 and 23. That is, the facing portion 24 does not become thinner in the vicinities of the sides 22 and 23 and does not warp in the laminate direction. The facing portion 28 of the second internal electrode 11 is also provided as described above.

The extending portions 25 and 29 of the first and the second internal electrodes 10 and 11 are extended to the end surfaces 7 and 8, respectively. At this stage, the exposure ends 15 and 16 are each arranged so as not to extend to a curved-surface formation range of the chamfer portion 19 described above. That is, as shown in FIG. 4, when a gap dimension from the side 22 of the facing portion 24 to the side surface 5 of the element body 2 is represented by Wg, the curvature radius of the curved surface of the chamfer portion 19 is represented by Rd, and the distance from the side 22 of the facing portion 24 to the end of the exposure end 15 is represented by D, Rd<Wg+D is satisfied. The reason for this is that when the exposure ends 15 and 16 are each extend to the curved-surface formation range of the chamfer portion 19, the corner portions of the internal electrodes 10 and 11 are polished, and delamination may be liable to occur from the above corners each functioning as a starting point.

As an electrical conductive material for the internal electrodes 10 and 11, for example, Ni, Cu, Ag, Pd, a Ag—Pd alloy, or Au may be used.

The thickness of each of the internal electrodes 10 and 11 is preferably about 0.3 μm to about 2.0 μm. In addition, the extending portions 25 and 29 each may have a thickness larger than that of each of the facing portions 24 and 28. Accordingly, the step of the laminate portion 12, which is liable to be generated in association with the extending portions 25 and 29, can be reduced.

As described above, in the internal electrodes 10 and 11, when viewed in the width direction between the side surfaces 5 and 6, the width of each of the exposure ends 15 and 16 of the respective extending portions 25 and 29 is preferably smaller than the width of each of the facing portions 24 and 28, and thereby, margin regions 33 are provided at the two sides of each of the extending portions 25 and 29 and between the sides of each of the extending portions 25 and 29 and the respective side surfaces 5 and 6.

Dummy electrodes 34 and 35 exposed to the end surfaces 7 and 8 are provided in the respective margin regions 33. The dummy electrode 34 is located on the same plane as that of the first internal electrode 10, and the dummy electrode 35 is located on the same plane as that of the second internal electrode 11. In addition, although the dummy electrode 34 and 35 are not necessarily exposed to the end surfaces 7 and 8, when being exposed thereto, the dummy electrodes 34 and 35 can increase the bonding strengths of the external electrodes 17 and 18 to the element body 2.

The dummy electrode 34 shown in FIG. 4 will be described. The dummy electrode 34 preferably is arranged in a region between an extension line 36 of the side 22 of the facing portion 24 facing the side surface 5 and a side 37 of the extending portion 25 facing the side surface 5 so as not to extend to the extension line 36 of the side 22 facing the side surface 5. That is, when the distance between a side 38 of the dummy electrode 34 at a side surface 5 side and the side surface 5 facing thereto is represented by E, and the gap dimension from each of the sides 22 and 26 of the respective facing portions 24 and 28 of the internal electrodes 10 and 11 to the side surface 5 of the element body 2 is represented by Wg, E>Wg is satisfied. In addition, the extension line 36 is located on an interface 30, which will be described later, between the laminate portion 12 and the ceramic side surface layer 13.

The distance E between the side 38 of the dummy electrode 34 at the side surface 5 side and the side surface 5 facing thereto is preferably larger than a distance F between a side 39 of the dummy electrode 34 at an extending portion 25 side and the side 37 of the extending portion 25 facing thereto.

In addition, the dummy electrode 34 preferably includes a plurality of electrode pieces 40 linearly extending in the direction parallel or substantially parallel to the side surface 5. Although three electrode pieces 40 are arranged at each of the two sides of the extending portion 25 in this preferred embodiment, one, two, or four electrode pieces may also be arranged at each side. In consideration of the printability of the electrode pieces 40, 2 to 3 electrode pieces 40 are preferably arranged.

In addition, when the dummy electrode 34 is exposed to the end surface 7, Rd<E is preferably satisfied. The reason for this is that when the dummy electrode 34 extends to the curved-surface formation range of the chamfer portion 19, since the corner portion of the dummy electrode 34 is polished, delamination is liable to occur therefrom as a starting point.

The dummy electrode 35 other than the dummy electrode 34 shown in FIG. 4 also has a structure similar to that described above.

The dummy electrodes 34 and 35 do not substantially contribute to capacity formation. However, the dummy electrode may have a chance to slightly face an internal electrode having a different potential, and in this case, a minute capacity may be formed in some cases. Therefore, it is not intended to eliminate the case in which the dummy electrode 34 and 35 form a capacity.

The dummy electrodes 34 and 35 are preferably formed from the same material as that for the internal electrodes 10 and 11. In addition, the conditions for the dummy electrodes 34 and 35, such as constituent materials and the thicknesses thereof, are similar to those of the internal electrodes 10 and 11.

As a ceramic material forming the ceramic layer 9 and the ceramic side surface layers 13 and 14, for example, a dielectric ceramic containing $BaTiO_3$, $CaTiO_3$, $SrTiO_3$, $CaZrO_3$, or the like as a primary component can be used. Accessory components, such as a Mn compound, a Mg compound, a Si compound, a Co compound, a Ni compound, and a rare earth element compound, may be added to the dielectric ceramic, if needed.

The ceramic material forming the ceramic side surface layers 13 and 14 preferably includes at least the same primary component as that of the ceramic material of the ceramic layer 9. In this case, ceramic materials having the same composition are most preferably used for the ceramic layer 9 and the ceramic side surface layers 13 and 14.

Incidentally, the present invention can also be applied to multilayer ceramic electronic components other than the multilayer ceramic capacitor. When the multilayer ceramic electronic component is, for example, a piezoelectric element, a piezoelectric ceramic, such as a PZT ceramic, is preferably used, and in the case of a thermistor, a semiconductor ceramic, such as a spinel ceramic, is preferably used.

Although the external electrodes 17 and 18 are preferably provided at least on the pair of end surfaces 7 and 8, respectively, of the element body 2 as described above, in this preferred embodiment, the external electrodes are preferably arranged to extend from the end surfaces 7 and 8 to portions of the principal surfaces 3 and 4 and portions of the side surfaces 5 and 6, respectively.

Although being not shown in the figure, the external electrodes 17 and 18 each preferably include an underlayer and a plating layer provided thereon. As an electrical conductive material for the underlayer, for example, Cu, Ni, Ag, Pd, an Ag—Pd alloy, or Au may be used.

The underlayer may be formed by using a co-firing method in which an electrical conductive paste is applied on a green element body 2 and is then simultaneously fired therewith or a post-firing method in which an electrical conductive paste is applied on the fired element body 2 and is then baked. Alternatively, the underlayer may be formed by direct plating or may be formed by curing an electrical conductive resin containing a thermosetting resin.

The thickness of the underlayer is preferably about 10 µm to about 150 µm at the thickest position, for example.

As a metal forming the plating layer provided on the underlayer, for example, a metal selected from the group consisting of Cu, Ni, Sn, Pb, Au, Ag, Pd, Bi, and Zn or an alloy containing at least one of the aforementioned metals may be used. The plating layer may include a plurality of layers. When the plating layer includes a plurality of layers as described above, a two-layer structure of Ni plating and Sn plating provided thereon is preferable. In addition, the thickness of the plating layer is preferably about 1 µm to about 15 µm per layer, for example.

Between the underlayer and the plating layer, an electrical conductive resin layer for stress relaxation may also be provided.

As clearly shown in FIG. 4, the side 22 of the facing portion 24 of the internal electrode 10 is located on the interface 30 between the laminate portion 12 and the ceramic side surface layer 13. As in the case described above, the side 26 of the facing portion 28 of the internal electrode 11 is also located on the interface 30 between the laminate portion 12 and the ceramic side surface layer 13. Therefore, the gap dimension Wg from each of the sides 22 and 26 of the facing portions 24 and of the internal electrodes 10 and 11, respectively, to the side surface 5 of the element body 2 corresponds to the thickness of the ceramic side surface layer 13.

In the relationship with the curvature radius Rd of the curved surface of the chamfer portion 19, the gap dimension Wg is preferably set so as to satisfy Wg<Rd. That is, since the curvature radius Rd is larger than the gap dimension Wg, an intersection line 32 extending from the interface 30 between the laminate portion 12 and the ceramic side surface layer 13 and the external surface of the element body 2 is preferably made to be located within the curved-surface formation range of the chamfer portion 19.

Although being not shown in FIG. 4, the same positional relationship as described above is also preferably satisfied in each of the chamfer portions 19 located at an upper right, a lower left, and a lower right of the element body 2 shown in FIG. 3.

As described above, if Wg<Rd is satisfied, the ceramic side surface layers 13 and 14 can be sufficiently prevented from being peeled off from the laminate portion 12.

The gap dimension Wg preferably satisfies 15 µm≤Wg. When Wg is 15 µm or more, cracks (linear cracks caused by breakage of the ceramic green sheets forming a gap portion) generated in the gap portion can be prevented. In addition, in order to achieve miniaturization of the multilayer ceramic capacitor and an increase in capacity thereof, Wg≤35 µm is preferably satisfied.

The curvature radius Rd of the curved surface of the chamfer portion 19 preferably satisfies 55 µm≤Rd. When Rd is about 55 µm or more, cracks and/or chips can be prevented from being generated in the element body 2. In addition, in order to more reliably prevent the thickness of the underlayer of each of the external electrodes 17 and 18 provided on the chamfer portions 19 from being locally decreased, Rd≤95 µm is preferably satisfied. As a result, the moisture resistance can be prevented from being degraded.

The distance D from the side 22 of the facing portion 24 to the end of the exposure end 15 preferably satisfies 90 µm≤D. Since moisture which may enter between the end of the external electrode 17 and the element body 2 is not likely to reach the exposure end 15 when D is about 90 µm or more, the moisture resistance can be prevented from being degraded.

The distance E between the side 38 of the dummy electrode 34 at the side surface 5 side and the side surface 5 facing thereto preferably satisfies 100 µm≤E. When E is about 100 µm or more, for example, even if misalignment caused by cutting is generated, the dummy electrode 34 can be reliably prevented from extending to the extension line 36.

The distance F between the side 39 of the dummy electrode 34 at the extending portion 25 side and the side 37 of the extending portion 25 facing thereto preferably satisfies 50 µm≤F. When F is about 50 µm or more, the dummy electrode 34 and the extending portion 25 can be prevented from being connected to each other by the influence of blur generated in printing and/or strain generated in pressing.

When Wg, Rd, D, E, and F are measured from the multilayer ceramic capacitor 1 as a finished product, in a surface parallel or substantially parallel to the principal surfaces 3 and 4 which is obtained by cutting the element body 2 at approximately one-half height thereof, the curvature radiuses Rd at the four corner portions, the gap dimensions Wg in the two gap regions, and the distance D from the side of the facing portion of the internal electrode to the end of the exposure end may be measured. In addition, at each corner portion, E>Wg or the relationship between the individual dimensions may be confirmed.

Next, a method for manufacturing the multilayer ceramic capacitor 1 described above will be described with reference to FIGS. 6A to 9.

First, ceramic green sheets to be formed into the ceramic layers 9, an electrical conductive paste for the internal electrodes 10 and 11 and the dummy electrodes 34 and 35, ceramic green sheets for the ceramic side surface layers 13 and 14, and an electrical conductive paste for the external electrodes 17 and are prepared. Binders and solvents are contained in the ceramic green sheets and the electrical conductive pastes, and as these binders and solvents, known organic binders and organic solvents can be used, respectively.

Next, as shown in FIGS. 6A and 6B, the electrical conductive paste is printed on ceramic green sheets 41, for example, by a screen printing method to have predetermined patterns. Accordingly, the ceramic green sheets 41 on each of which internal electrode patterns 42 to be used as the internal electrodes 10 and 11 are formed are obtained.

According to this preferred embodiment, a plurality of lines of internal electrode patterns 42 each having a substantially belt shape is formed on each ceramic green sheet 41. In FIGS. 6A and 6B, imaginary cutting lines 43 in a longitudinal direction (up and down direction in FIGS. 6A and 6B) in which the belt-shaped internal electrode patterns 42 extend and imaginary cutting lines 44 in a width direction (left and right direction in FIGS. 6A and 6B) perpendicular or substantially perpendicular thereto are shown. The belt-shaped internal electrode pattern 42 has a shape in which a plurality of sets each containing the two internal electrodes 10 and 11 connected to each other at the respective extending portion 25 and 29 is arranged along the longitudinal direction.

The belt-shaped internal electrode pattern 42 includes one pair of sides 45 and 46 linearly extending along the longitudinal direction. In addition, in each belt-shaped internal electrode pattern 42, longitudinal hexagonal hole portions 47, in each of which no internal electrode pattern is provided, are arranged at the center in the width direction with predetermined pitches along the longitudinal direction. This structure is derived from the shapes of the extending portions 25 and 29 described above.

Furthermore, in the hole portions 47, a plurality of linear dummy electrode patterns 52 is provided. These are to be formed into the dummy electrodes 34 and 35 and are simultaneously printed with the internal electrode patterns 42.

Figure 7:
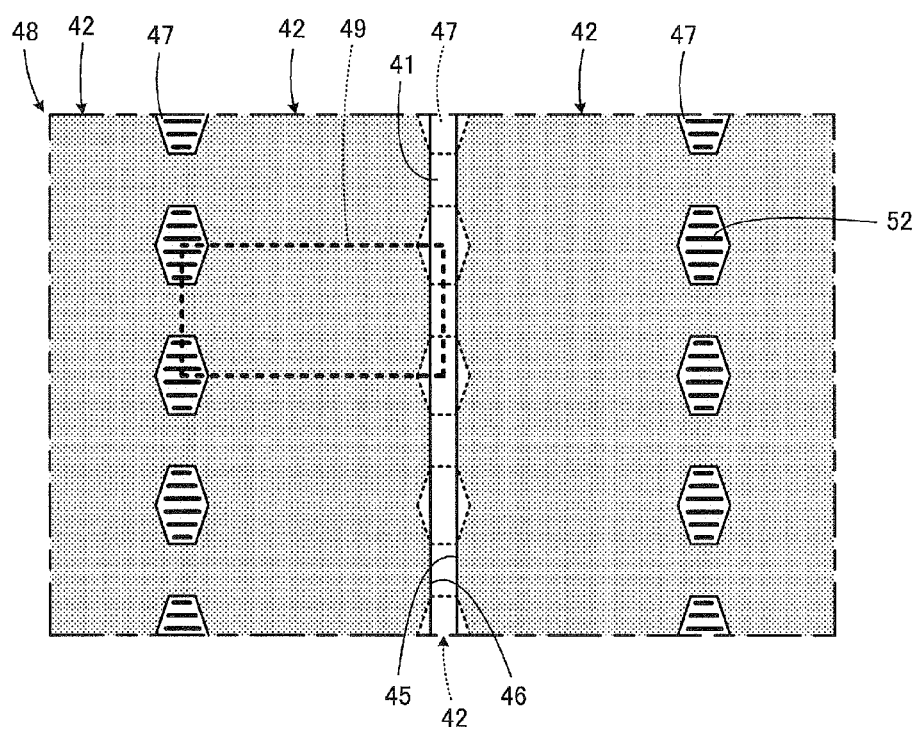
FIG. 7 is an enlarged plan view showing the state in which the ceramic green sheets shown in FIGS. 6A and 6B are laminated.

Next, a predetermined number of the ceramic green sheets 41 on which the internal electrode patterns 42 and the dummy electrode patterns 52 are formed as described above are laminated to each other in a predetermined order to form a laminate, and a predetermined number of ceramic green sheets for external layers on which no electrical conductive paste is printed are laminated on each of the top and the bottom of the above laminate, so that a mother block 48, part of which is shown in FIG. 7, is formed. FIG. 7 shows the state of the mother block obtained by removing the ceramic green sheets for external layers provided on the ceramic green sheets 41 on which the internal electrode patterns 42 and the dummy electrode patterns 52 are formed.

In the laminating step described above, as shown in FIGS. 6A and 6B, the ceramic green sheets 41 are laminated to each other while being shifted with predetermined intervals, each of which is a half of the width direction dimension of the internal electrode pattern 42, along the width direction of the belt-shaped internal electrode pattern 42.

Next, the mother block 48 is pressed in the laminating direction by a method, such as hydrostatic pressure pressing, if needed.

Figure 8:
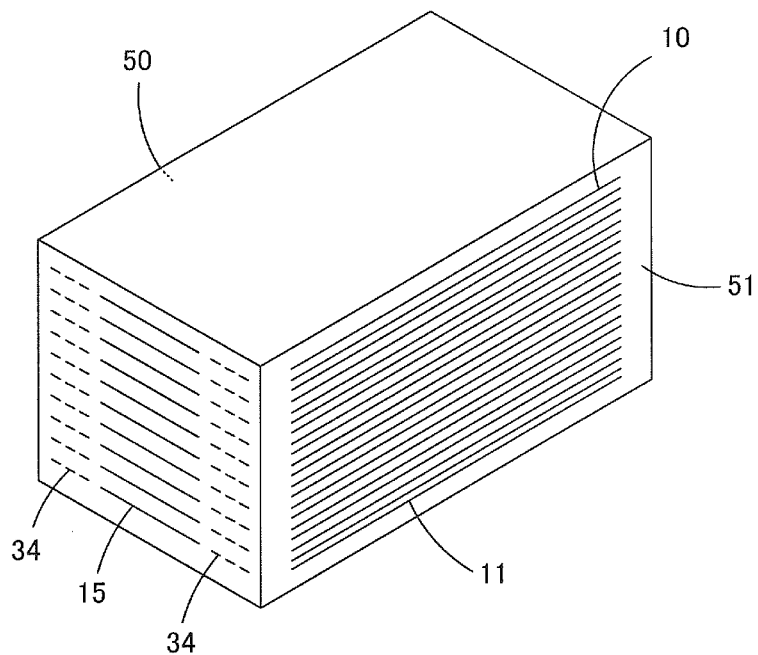
FIG. 8 is a perspective view showing the appearance of a green chip obtained by cutting a mother block formed by laminating the ceramic green sheets shown in FIGS. 6A, 6B and 7.

Next, the mother block 48 is cut along the imaginary cutting lines 43 in the longitudinal direction and the imaginary cutting lines 44 in the width direction shown in FIGS. 6A and 6B, and a green chip 49 as shown in FIG. 8 is obtained. As shown in FIG. 7, an area of the mother block 48 to be formed into the green chip 49 is surrounded by the dotted line.

As shown in FIGS. 6A, 6B and 7, one imaginary cutting line 43 in the longitudinal direction is arranged to equally divide the belt-shaped internal electrode pattern 42 into two portions in the width direction, that is, is located to equally divide the hole portion 47 into two portions in the width direction, and on the other hand, another imaginary cutting line in the longitudinal direction adjacent to the imaginary cutting line 43 is located so as to equally divide an area between the sides 45 and 46 of adjacent internal electrode patterns 42 into two portions in the width direction.

As shown in FIG. 8, the green chip 49 has parallel or substantially parallel side surfaces 50 and 51 located inside and parallel to the side surfaces 5 and 6 of the element body 2. These side surfaces 50 and 51 are formed from cut surfaces along the imaginary cutting lines 44 in the width direction described above. The green chip 49 corresponds to the laminate portion 12 at a green stage and has a laminate structure including a plurality of green ceramic layers 9 and a plurality of pairs of green internal electrodes 10 and 11.

As described above, since the margin regions 33 are formed by decreasing the widths of the exposure ends 15 and 16 to be smaller than the widths of the facing portions 24 and 28, the corners of the extending portions 25 and 29 of the internal electrodes 10 and 11 can be withdrawn inside, and at the same time, the ceramic layers 9 can be closely adhered to each other in the margin regions 33. Therefore, the delamination can be prevented.

Figure 9:
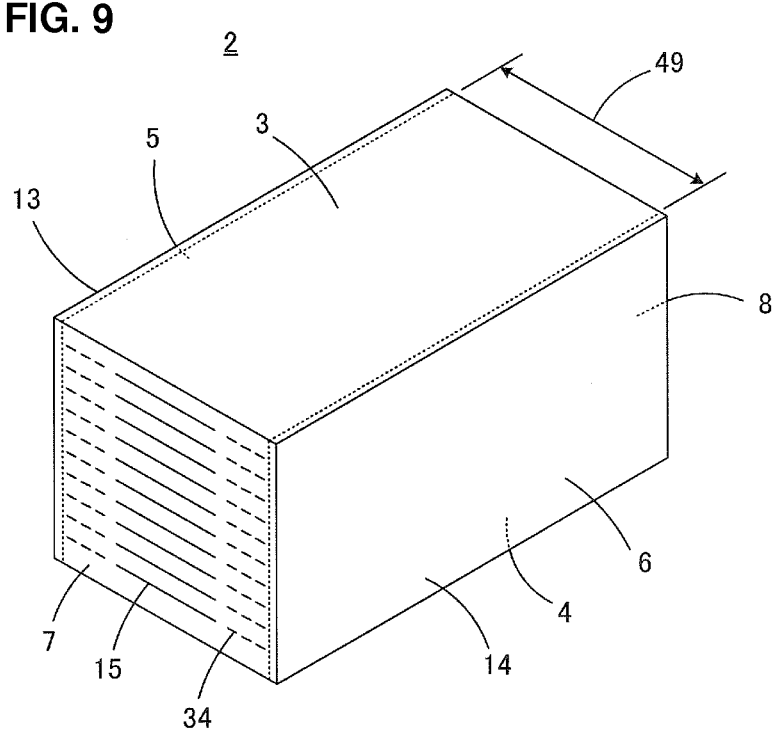
FIG. 9 is a perspective view showing the state in which ceramic side surface layers are provided on the green chip shown in FIG. 8.

Next, as shown in FIG. 9, green ceramic side surface layers 13 and 14 defining the side surfaces 5 and 6, respectively, of the element body 2 are formed on the side surfaces 50 and 51 of the green chip 49, thereby forming the green element body 2 before polishing.

Hence, a green ceramic material is supplied on the parallel side surfaces 50 and 51 of the green chip 49. For the supply of this green ceramic material, the ceramic green sheets are used, and the ceramic green sheets are provided on the side surfaces 50 and 51 of the green chip 49. Alternatively, a ceramic paste may be applied on the parallel side surfaces 50 and 51 of the green chip 49, for example, by a printing method, such as a screen printing method, an ink jet method, a coating method, such as a gravure coating method, or a spray method. In the method for adhering ceramic green sheets among these supply methods describe above, since a separate object is adhered to the green chip 49, the adhesive strength is liable to decrease as compared with that obtained by the other methods; hence, the effect obtained by Wg<Rd can be particularly expected. Since the ceramic side surface layers 13 and 14 are formed, the green internal electrodes 10 and 11 exposed to the side surfaces 50 and 51 are covered therewith.

Next, a polishing step is performed on the green element body 2. As the polishing method, for example, barrel polishing may be used, for example. The chamfer portions 19 to 21 described above are formed by this polishing method.

In this polishing step, the intersection line 32 formed from each of the interfaces of the green chip 49 and the ceramic side surface layers 13 and 14 (corresponding to each of the interfaces 30 and 31 of the laminate portion 12 and the ceramic side surface layers 13 and 14, see FIGS. 3 to 5) and each external surface of the green element body 2 is preferably located within the curved-surface formation range of the chamfer portion 19. In other words, the dimension of the gap region defined by each of the green ceramic side surface layers 13 and (corresponding to the gap dimension Wg described above) is preferably set smaller than the curvature radius Rd of the curved surface of the chamfer portion 19.

When the polishing step is performed so as to satisfy the above conditions, since the green ceramic material of the green chip 49 and/or the ceramic side surface layers 13 and 14 is extended so as to fill the interfaces between the green chip 49 and the ceramic side surface layers 13 and 14, this green ceramic material functions as so-called "putty", and as a result, the adhesive strength between the green chip 49 and each of the ceramic side surface layers 13 and 14 is increased.

In this polishing step, as described above, the exposure ends 15 and 16 of the green internal electrodes 10 and 11 exposed to the end surfaces 7 and 8 of the green element body are each formed so as not to extend to the curved-surface formation range of the chamfer portion 19.

Next, the green element body 2 is fired. Although depending on the ceramic material contained in the ceramic green sheet 41 and the ceramic side surface layers 13 and 14 and the metal material contained in the internal electrodes 10 and 11, a firing temperature is preferably set, for example, in a range of about 900° C. to about 1,300° C.

Next, the underlayers of the external electrodes 17 and 18 are formed by applying an electrical conductive paste on the two ends surfaces 7 and 8 of the fired element body 2, followed by baking. A baking temperature is preferably about 700° C. to about 900° C.

In addition, if needed, plating is performed on the surfaces of the underlayers of the external electrodes 17 and 18, and the multilayer ceramic capacitor 1 shown in FIG. 1 is completed.

In the first preferred embodiment described above, the shapes of the extending portions 25 and 29 of the internal electrodes 10 and 11 can be variously changed by changing the shape of the hole portion 47.

Figure 10:
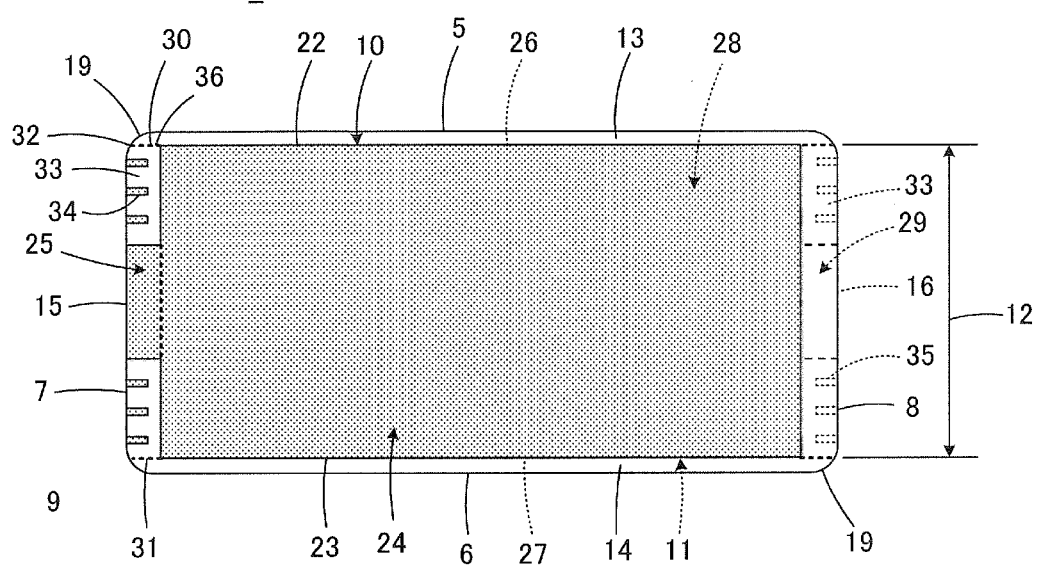
FIG. 10 is a plan view corresponding to FIG. 3 and showing the internal structure of the element body of the multilayer ceramic capacitor as a multilayer ceramic electronic component according to a second preferred embodiment of the present invention.

Next, a second preferred embodiment of the present invention will be described with reference to FIG. 10. Incidentally, FIG. 10 corresponds to FIG. 3. In FIG. 10, elements corresponding to the elements shown in FIG. 3 are designated by the same reference numerals, and a duplicate description will be omitted.

According to the second preferred embodiment, as in the case of the first preferred embodiment, the extending portions 25 and 29 of the internal electrodes 10 and 11 have widths smaller than those of the facing portions 24 and 28 and each extend with a predetermined width. However, the structure is not used in which the regions of the facing portions 24 and 28 extending to the extending portions 25 and 29 have widths which are gradually decreased.

Figure 11:
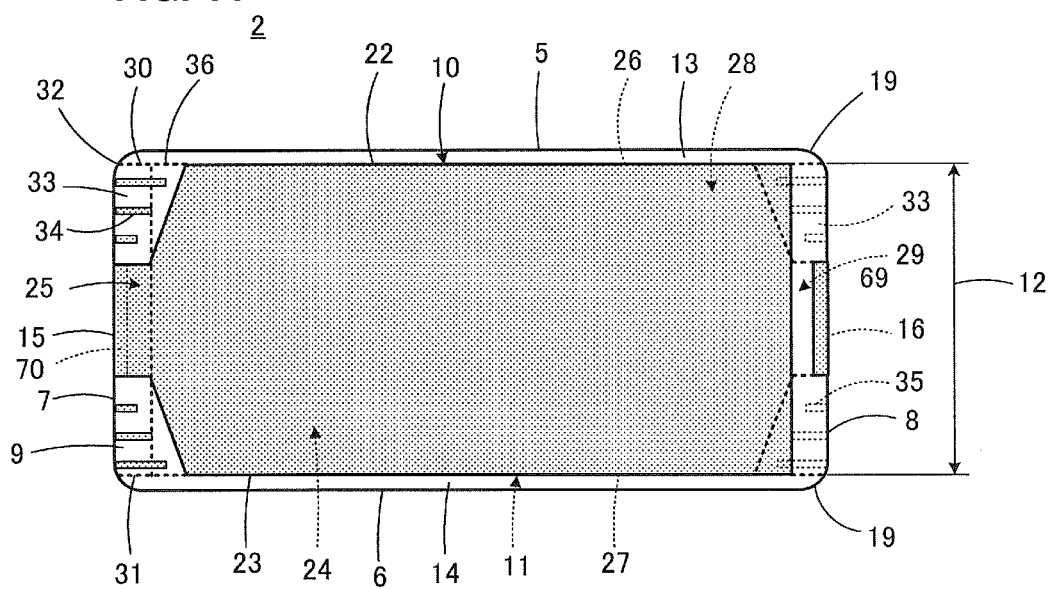
FIG. 11 is a plan view corresponding to FIG. 3 and showing the internal structure of the element body of the multilayer ceramic capacitor as a multilayer ceramic electronic component according to a third preferred embodiment of the present invention.

Next, a third preferred embodiment of the present invention will be described with reference to FIG. 11. Incidentally, FIG. 11 corresponds to FIG. 3. In FIG. 11, elements corresponding to the elements shown in FIG. 3 are designated by the same reference numerals, and a duplicate description will be omitted.

In the third preferred embodiment, as shown in FIG. 11, the internal electrodes 10 and 11 each have the substantially same structure as that of the first preferred embodiment.

One of the unique features of the third preferred embodiment is that second dummy electrodes 69 and 70 are preferably exposed to the end surfaces 8 and 7, respectively. The dummy electrode 69 is located on the same plane as that of the first internal electrode 10, and the dummy electrode 70 is located on the same plane as that of the second internal electrode 11.

These second dummy electrodes 69 and 70 also do not substantially contribute to capacity formation. In addition, the dummy electrodes 69 and 70 are preferably formed from the same material as that for the internal electrodes 10 and 11. Furthermore, the conditions for the dummy electrodes 69 and 70, such as constituent materials and the thicknesses thereof, are similar to those of the internal electrodes 10 and 11.

When the second dummy electrodes 69 and 70 are formed as in this preferred embodiment, the step liable to be generated at the laminate portion 12 or the green chip 49 in association with the extending portions 25 and 29 can be further reduced, and the adhesive strengths of the external electrodes 17 and 18 to the element body 2 can also be further increased.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:
    an element body including a pair of principal surfaces facing each other, a pair of side surfaces facing each other, and a pair of end surfaces facing each other, rounded chamfer portions located along ridgelines between the side surfaces and the end surfaces, and a plurality of ceramic layers extending in a principal surface direction and laminated in a direction perpendicular or substantially perpendicular thereto and a plurality of pairs of internal electrodes which are provided along interfaces between the ceramic layers, which each include an exposure end exposed to one of the pair of end surfaces, and which are not exposed to the side surfaces;
    external electrodes provided at least on the pair of end surfaces of the element body so as to be electrically connected to the exposure ends of the internal electrodes; and
    dummy electrodes provided along the interfaces between the ceramic layers; wherein
    each of the internal electrodes includes:
        a facing portion including two sides parallel or substantially parallel to the side surfaces of the element body and facing an adjacent internal electrode with at least one of the ceramic layers interposed therebetween; and
        an extending portion extending from the facing portion to one of the end surfaces of the element body to define the exposure end at the end of the extending portion; wherein
    a width of the exposure end of the extending portion is smaller than a width of the facing portion when viewed in a width direction between the side surfaces of the element body so as to define margin regions at two sides of the extending portion and between the two sides of the extending portion and the respective side surfaces of the element body;
    the dummy electrodes are provided in the margin regions of each of the internal electrodes; and
    in regions of the margin regions of each of the internal electrodes between extension lines of the two sides of the facing portion that are parallel or substantially parallel to the side surfaces of the element body and the respective two sides of the extending portion, the dummy electrodes are arranged so as not to extend to the extension lines of the two sides of the facing portion that are parallel or substantially parallel to the side surfaces of the element body.

2. The multilayer ceramic electronic component according to claim 1, wherein a distance between a side of each dummy electrode at a side surface side and the side surface of the element body facing thereto is larger than a distance between a side of the dummy electrode at an extending portion side and the side of the extending portion facing thereto.

3. The multilayer ceramic electronic component according to claim 1, wherein each of the dummy electrodes includes a plurality of electrode pieces linearly extending parallel or substantially parallel to the side surfaces of the element body.

* * * * *